United States Patent [19]
Bottard et al.

[11] 3,988,579
[45] Oct. 26, 1976

[54] SYSTEM FOR TESTING A DATA PROCESSING UNIT

[75] Inventors: Gilles Jean Marcel Bottard, Paris; Marcel René Rottier, Rosny, Bois, both of France

[73] Assignee: Compagnie Honeywell Bull (Societe Anonyme), Paris, France

[22] Filed: May 21, 1974

[21] Appl. No.: 471,928

[30] Foreign Application Priority Data
May 28, 1973 France .............................. 73.19329

[52] U.S. Cl. .......................................... 235/153 AK
[51] Int. Cl.² ............................................ G06F 11/04
[58] Field of Search ........... 235/153 AK; 340/172.5; 445/1

[56] References Cited
UNITED STATES PATENTS

| | | | |
|---|---|---|---|
| 3,519,808 | 7/1970 | Lawder | 235/153 AK |
| 3,631,229 | 12/1971 | Bens et al. | 235/153 AK |
| 3,813,531 | 5/1974 | King et al. | 235/153 AK |
| 3,838,260 | 9/1974 | Nelson | 235/153 AK |

Primary Examiner—Charles E. Atkinson
Attorney, Agent, or Firm—Cameron, Kerkam, Sutton, Stowell & Stowell

[57] ABSTRACT

The disclosure described improved apparatus for testing a data processing system including first and second functional members. First and second microprograms for testing the first and second functional members, respectively, are held in a read only store. If an error is detected in the first functional member while the data processing system is processing data, a circuit transmits the starting address of the first microprogram to an address register for the store, so that the first microprogram tests the defective first functional member. As the first functional member is tested, the symptoms needed to diagnose the defect are collected. If the first microprogram is completed without all of the symptoms required for diagnosis being collected, another circuit transmits the first address to the address register so that the first microprogram is executed again. The first microprogram continues to be executed until all of the symptoms needed for diagnosis are collected. The same procedure is used for the testing of the second functional member.

7 Claims, 4 Drawing Figures

SYSTEM FOR TESTING A DATA PROCESSING UNIT

BACKGROUND OF THE INVENTION

The present invention relates to an improvement to a system for testing a data processing unit which is made up of several functional members.

The large number of components used in a computer poses a complex problem when it is a question of detecting and locating faults which may occur in the computer. Two types of possible faults are generally distinguished; namely "permanent" faults which may be detected at any time subsequent to their appearance, and transient so-called "intermittent," faults which appear and disappear at least once during the time when the member or component from which the type of fault in question originates is operating. Fault detection is generally accomplished by means of detectors for detecting functional errors which are located at the outputs of the various functional members of a computer and in particular of a data processing unit. The localization of these detectors being known, the faulty functional member is located by means of information transmitted to an associated test system, which may include a maintenance panel fitted with a display screen. By a better approach of the actual behaviour of the faulty member, by using a test routine for example, it is then possible to locate the group or groups of components which are at the source of the error which has been detected.

Among the intermittent fault which may occur in a data processing unit, the main ones are those due to noise or any other transitory phenomenon such as mechanical vibration. Of functional error detectors, the best known are parity checking devices which supply a bit-combination having a predetermined value when no error exists. After the parity of the data introduced into a functional member and the parity of the data extracted from this same member have been checked, a comparison between the two parities makes it possible to establish whether an error second occured in the member in question. In order to make use of the error detection carried out by means of the parities, various processes may then be used to establish whether the ault is a permanent one and to locate the fault in a functional member or in a component within the member. Certain known processes also allow some intermittent faults to be detected at the functional member level. It is for example possible to cause a processing operation to be repeated in a functional member which has been found to be defective by feeding back the same data into the member in question, so as to see whether the error will re-occur. If the error is detected for a ssecond time the fault is assumed to be permanent and a routine is put in hand. on the other hand, if the error is no longer apparent after the repetition, data continues to be processed in the unit in question. It will be realised that this procedure constitutes only a means of detecting certain intermittent faults, but not one of locating them at the level of the component responsible. Furthermore, the time spent in repeating certain processing operations may be considerable in the case of intermittent faults which recur with great frequency and the time taken in processing may be considerably prolonged by numerous repetitons before an intermittent fault can be considered sufficiently serious for it to be necessary to stop the unit and call in a trouble-shouter. To overcome the drawbacks certain processes consist in establishing whether a functional member is or is not being used during a given processing cycle. If an error is detected in a member in active use an error routine is carried out in the conventional way. If a member is not being used, a test word is fed into it to see whether it is faulty. If it does show a fault, a waiting cycle is initiated so that test data can again be fed to the said member and the continued presence of the fault can be checked for in this way. If the fault is still present, an error routine is carried out. If repetition fails to show up an error, the waiting cycle is cancelled and processing continues. In this way, since the test is carried out when the member is not being used, the error is detected before any data is processed by the said member and this allows any error to be detected before the data is mutilated. This process offers the advantages of advance detection, a particular feature of which is that it allows circuits to be re-structured before any processing takes place in the various members. This prevents the processing unit in question being used despite the fact that it is not working properly. The drawback of this process is that it does not allow certain troublesome intermittent faults to be detected in time. In effect, when a member is checked before it is put into operation, it often happens that an intermittent fault will only make its appearance after the test cycle for the said member has ended, that is to say while processing is under way. In the latter event, a process of this type has the same shortcomings as those mentioned before.

To prevent intermittent faults from causing excessive disruption in a processing operation which is to be carried out, it is important that they should be capable of detection at any time, that is to say, not only before processing is carried out but also while it is going on, and they should also be capable of being located very quickly.

An integrated test system such as that described in U.S. Patent application Ser. No. 450,936 entitled "Testing System for testing a Data Processing Unit," which was filed by the present Applicants on Mar. 13, 1974, makes possible a very swift reaction when a fault occurs while data is being processed and allows the unit in question to be tested both when it is put into operation and also at any other time when an error is detected in the unit. With such a system, the instruction for the test to be carried out may come either from another part of the computer in which the unit to be tested is included (such as from another processing unit for example) or from a maintenance station. With tests automatically controlled and carried out quickly, it is possible to detect many faults which persist for a time which, in comparison with the time to carry out a test, is sufficiently long to enable the fault to be exactly located. When it is intermittent faults that are concerned, it becomes more difficult to detect them and especially to locate them. In effect, an intermittent fault may occur with a little frequency, in which case there is no reason why it should prevent the processing unit from remaining available to a user as long as the fault in question fails to make an appearance. On the other hand an intermittent fault may occur with a great frequency, in which case it is unthinkable to continue with a processing operation which gives false results. Finally, an intermittent fault may make a very brief appearance which, fleeting though it is, may disrupt the processing operation which is underway and falsify its result. In this latter case it is also necessary to be able to identify the fault. It might be thought than an intermittent fault is detectable and can be located when the time for which it is present is at least equal to the duration of the test sequence which needs to be carried out to test the member in question. However this condition is not sufficient. In fact the time at which the fault appears during the test sequence which is carried out to detect and locate it is important also. If, for example, an intermittent fault appears only at the end of a test sequence, even if it is detected, the time for which it manifests itself is too short within the said sequence to provide enough symptoms to locate the fault. Similarly, if an intermittent fault appears after a test sequence has begun, all the symptoms necessary to identify the fault may still not be gathered when the sequence is continued to its conclusion.

One of the objects of the present invention is to enable the testing of at least one functional member of a data processing unit to be initiated immediately after an error is detected when the said unit is processing.

Another object of the invention is to enable tests to be carried out in a data processing unit until a fault makes an appearance.

Another object of the invention is to enable tests performed on at least one functional member of a data processing unit to be repeated.

Another object of the invention is to enable the testing of the various functional members of a data processing unit through respective test sequences each having a time duration which is short in comparison with that of the foreseeable intermittent faults liable to disrupt data processing operations.

SUMMARY OF THE INVENTION

The invention relates to an improvement to a system for testing a data processing unit P1 which is made up of $n$ functional members (F1...Fn) one of which is composed of a permanent store RO and its addressing circuit AD, the said test system being integrated in unit P1, making use of test microprogrammes recorded in an area Z in store RO and including test circuits T connected to the said store; the said microprogrammes being designed in a known per se manner and according to the needs to test the $n$ members (F1...Fn) are arranged in a group of sequences of microinstructions which are carried out by the said circuits T to collect all the previously identified symptoms S associated with each foreseeable fault. These circuits T contain two detectors E1 and E2 to detect errors in the $n$ members (F1...Fn) in the course of testing and in the course of data processing respectively. The said test microprogrammes are recorded in the order in which area Z in store RO is addressed by circuit AD to test the $n$ members (F1...Fn) successively, in a succession of n microinstruction sequences, the n sequences being designed to allow detector E1 to detect errors in the $n$ respective members, and to allow test circuits T to collect all the symptoms needed to identify one fault in the $n$ respective members (F1...Fn) from among all the foreseeable permanent and intermittent faults. The test circuit T further comprise a first test repeat circuit which is connected to detector E1 and to circuit AD and which is designed to control the repetition of at least one of the n microinstruction sequences, a second test control circuit which is connected to detector E2 and to circuit AD and which is designed to control a defective member from the group (F1...Fn) to be tested at least once while data processing, and a third decision circuit 3 which is connected to detector E1 and which is designed to produce a signal which will validate the said first circuit when not all the fault symptoms needed for diagnosis have been collected when the testing of a defective member has been completed, and a diagnosis-validating signal when all the symptoms of a fault in a defective member have been collected.

Other features and advantages of the invention will become apparent from the following description which is given by way of non-limiting exmple and which refers to the accompanying figures.

DESCRIPTION OF THE PREFERRED EMBODIMENT

Figure 1:
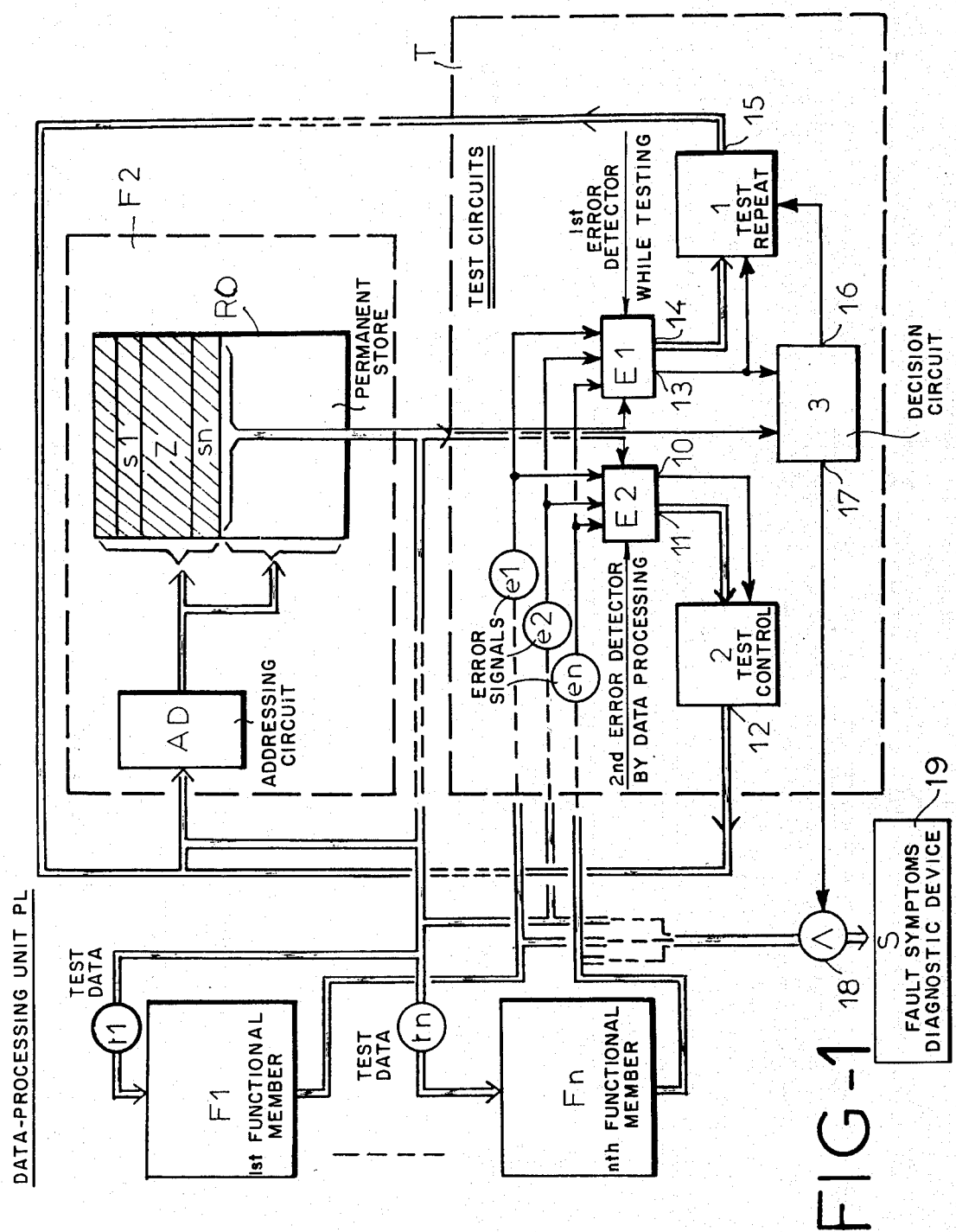
FIG. 1 is a diagram showing the principle of an improvement to a system according to the invention for testing a data processing unit.

The $n$ members (F1...Fn) of a data processing unit P1 are shown in FIG. 1 together with the improvement to a system for testing the unit which is the subject of the present invention. The members in question comprise in particular a member F2 which is formed by a permanent store RO and its addressing circuit AD. Store RO contains an area (not shown in FIG. 1) where microprogrammes for data processing unit P1 are recorded. Store RO also contains an area Z where test microprogrammes to be used by the test system are recorded. The invention relates to an improved test system for carrying out a testing procedure before or while data is processed through the interaction of a specific arrangement of circuits. In FIG. 1, the area Z in store RO contains n sub-zones ($s1$....$sn$) which are arranged in an order such that, when store RO is addressed in the normal way by the addressing circuit AD, $n$ consecutive microinstruction sequences are carried out so as to test the $n$ members (F1...Fn) in succession and, if a fault occurs, to collect all the symptoms needed to locate this fault in one of the n members. By store RO being addressed in the normal way, is meant that circuit AD employs known means to address store RO at each read-out cycle and increments the address of the word which has just been read out from the said store by one unit. From the output of store RO test data ($t1$)...($tn$) is fed to members (F1...Fn) respectively. Known functional-error detectors (not shown in FIG. 1) are located at the outputs of the various members to be tested so that they will produce signals ($e1$)...($en$) if an error occurs in members (F1...Fn) respectively. Signals ($e1$)...($en$) are fed to a first error detector E1 which is incorporated in the test circuits T which are part of the system an improvement to which forms the subject matter of the present invention. When processing unit P1 is being tested, the presence of one of the signals ($e1$)...($en$) indicates by means of detector E1 that an error is present in one of the members (F1...Fn) and enables the defective member to be located on the basis of the origin of the signal. Similarly, when data is being processed in unit P1, the presence of erroneous data at the output of one of the members (F1...F$n$) is detected by the appropriate functional-error detector and one of the signals ($e$1)...($en$) is transmitted to a detector E2 in circuits T. From an output 10 of detector E2 the presence of an error in unit P1 is indicated to a test control circuit 2. From an output 11 of the same detector, a combination of signals is fed to test control circuit 2 to indicate the member in which detector E2 has detected an error while data is being processed. Output 12 of test control circuit 2 is connected to the input of circuit AD, and provides a combination of signals to store RO to address the latter at the first address in the one of the areas ($s$1...$sn$) which contains the microinstructions for testing the member indicated as defective by detector E2. The presence of a signal ($e$1)...($en$) produced by one of the members (F1...F$n$) indicates, via an output 13 of detector E1 which is connected to a circuit 1, the presence of an error in the member which bears the same index number. From an output 14 of detector E1 a combination of signals is fed to circuit 1 to indicate the functional member in which detector E1 has detected an error when unit P1 is being tested. Output 15 of circuit 1 is connected to the input of addressing circuit AD and provides a combination of signals fed to store R0 to address the latter at the first address of the zone included in sub-zones ($s$1...$sn$) which contains the microinstructions for testing the member indicated as defective by detector E1. On the basis of the microinstructions contained in each of the areas ($s$1...$sn$) and using known means which call into action at least one store member from the group (F1...F$n$), at least one combination of signals coming from one of the members tested gives the symptoms S which enable a fault detected by detector E1 in a member to be located. In FIG. 1, a decision circuit 3 connected to output 13 of detector E1 is designed to indicate if all the symptoms S required to locate a fault in a member which has been recognized as defective by detector E1 are available. An output 16 of circuit 3 transmits a signal to test repeat or validate circuit 1 when not all the symptoms S are available. An output 17 of circuit 3 transmits a diagnosis-validating signal (assuming all the symptoms S available) to a circuit 18 for transferring the symptoms S to a diagnostic device 19, which may be an external member connected to unit P1. As an example, FIG. 1 shows in addition that detectors E1 and E2 are validated, while unit P1 is being tested and while it is processing respectively, by two output connections from store R0 to the detectors E1 and E2. Also as an example, circuit 3 is controlled in FIG. 1 by an output connection from store R0 to the circuit in question.

Figure 2:
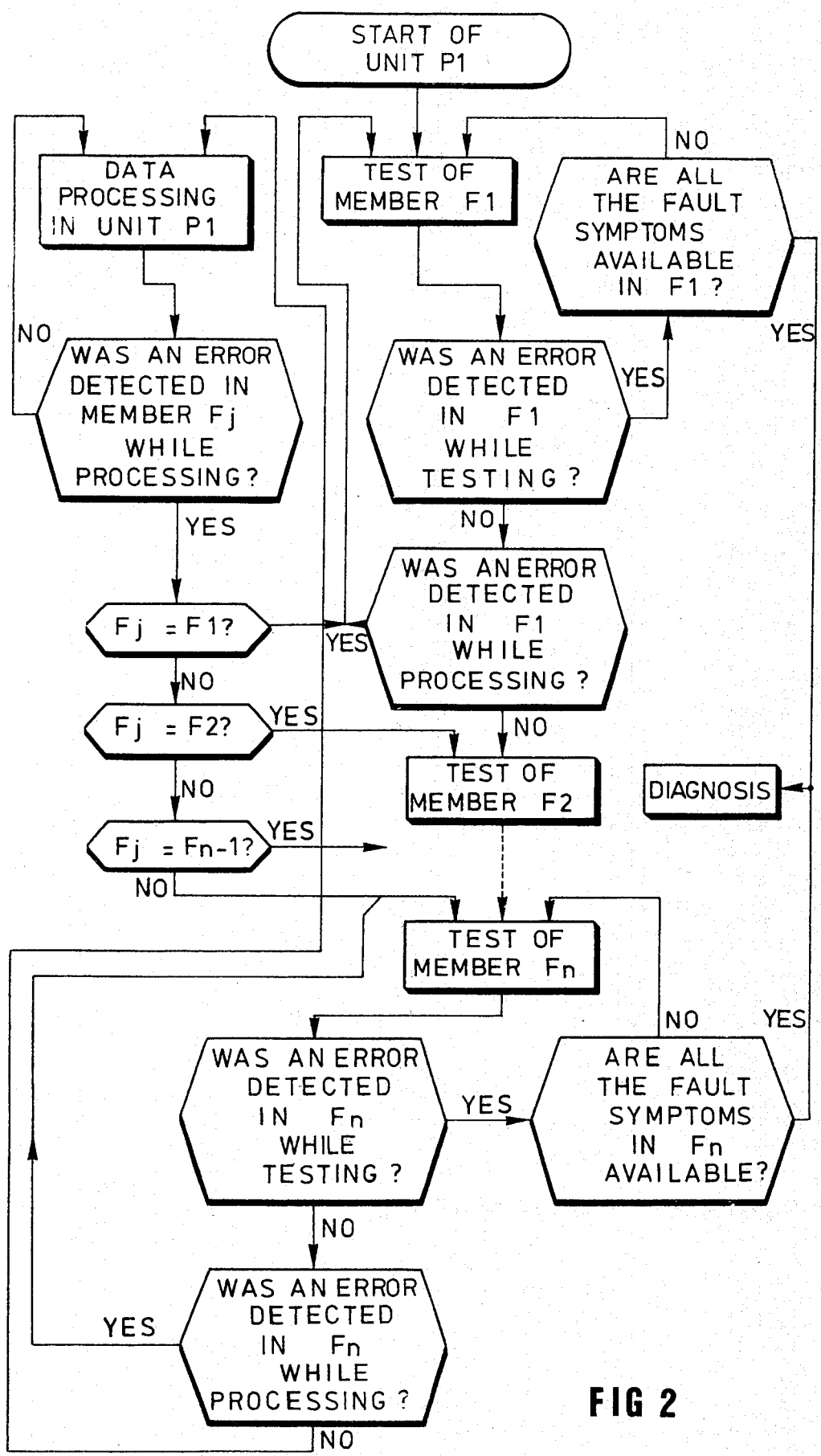
FIG. 2 is a flow-chart showing the principle on which the improvement to a test system according to the invention.

The flow-chart in FIG. 2 shows how the improvement to a test system shown in FIG. 1 operates. When the data processing unit P1 is put into operation, which may be done manually, the first member F1 is automatically caused to be tested using means described in the aforementioned Patent application Ser. No. 450,936. Detector E1 makes it possible to indicate whether an error is detected in member F1 while it is being tested. If an error is detected and the time at which the error in question appears is such that not all the symptoms required to locate the fault can be collected, an order is given by circuit 1 in FIG. 1 for the test on member F1 to be repeated. If on the other hand all the symptoms needed are available, circuit 3 enables a diagnostic process to be undertaken to locate the fault in member F1. When no error is detected when member F1 is tested, testing of member F2 begins, and so on until member F$n$ has been tested. If detector E1 detects no error in member F$n$, an "in order" signal (not shown) for unit P1 is generated by test circuits T in the aforementioned FIG. 1 using the means described in patent application Ser. No. 450,936, this signal allowing data to be processed in unit P1. While data is being processed the functional-error detectors already mentioned come into play if an error should appear in one of the members (F1...F$n$) and supply in coded form, via detector E2, the identity of the member F$j$ which is the source of the error. Using known means, a co-relation is established between the coded identity of F$j$ and the address in store R0 where the beginning of the microinstruction sequence for testing member F$j$ is recorded, that is to say area $sj$. The connection between output 12 of test control circuit 2 and the input of address circuit AD conveys information from detector E2 which enables the address circuit AD to order the test sequence for testing member F$j$ to be carried out. If, while member F$j$ is being tested, detector E1 detects an error and if all the fault symptoms are collected, unit P1 is stopped and a diagnosis carried out. If detector E1 detects an error but not all the fault symptoms are collected, F$j$ is tested again. If testing member F$j$ fails to reveal the error previously detected by the detector E2, the test on F$j$ is repeated until the error reappears and is detected by detector E1. As before, the diagnosis is only carried out when all the fault symptoms are available. Thus, although an intermittent fault which appears for the first time while data is being processed may disappear when a first cycle is carried out to test the member F$j$ which was found defective by detector E2, by repeatedly testing member F$j$, which occurs when there is a signal from detector E2 but no signal from detector E1, the intermittent fault which had disappeared the first time will again be detected by detector E1 and diagnosis can be carried out under the conditions already described. The improvement described with reference to FIGS. 1 and 2 comprises means of testing unit P1 using test sequences which are relatively short in comparison with the time taken to test the entire unit, bearing in mind the number of functional members contained in a processing unit. Thus, the relative shortness of the time taken to carry out each test sequence achieved by the present invention is compatible with the brief time for which foreseeable intermittent faults liable to disturb processing operations to be carried out in unit P1 may appear. In this way the duration of one of the said test-sequences is compatible with the time required to collect all the symptoms (from the member in question) which will enable an intermittent fault to be located in a functional member of unit P1.

Figure 3:
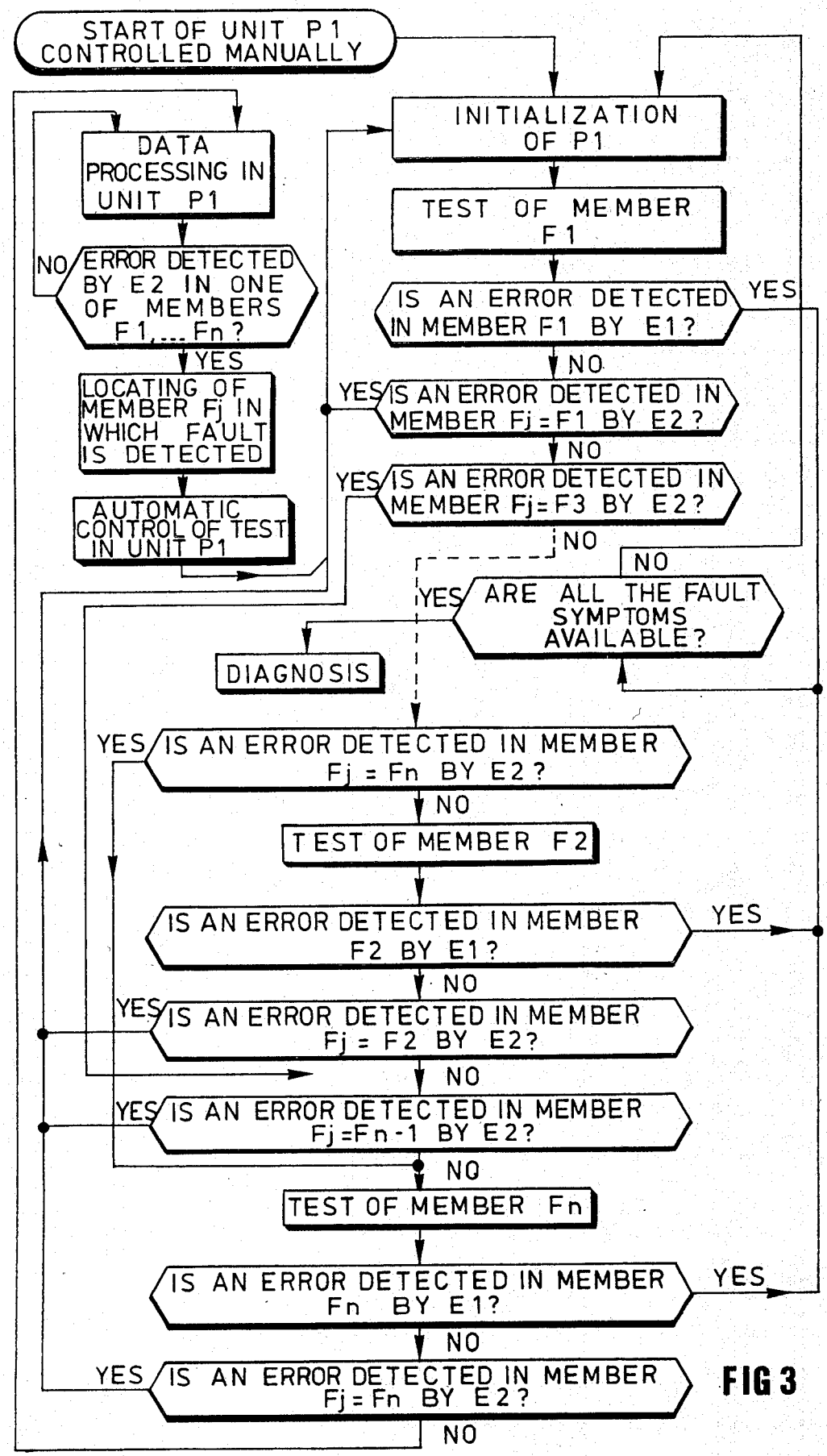
FIG. 3 is a flow-chart showing a particular mode of operation of the improvement to a test system according to the invention.

A particular way in which the improvement to a test system according to the invention may operate is shown in FIG. 3. The data processing unit P1 to be tested in this case contains an initial-setting circuit which, when unit P1 is put into operation, is instructed to reset all the storage members of the unit to zero before any processing takes place in it. Patent application Ser. No. 450,936 mentioned above describes means (including the said initial-setting circuit) by which unit P1 is tested on the basis of an initial reference condition. The unit P1 which is tested in the way shown in FIG. 3 includes a member F1 which contains basis logic circuits which allow the said unit to operate. In this case, the other members (F2...Fn) can only be tested if member F1 is operating satisfactorily. If an error is detected in member Fj by detector E2, the instruction for this member to be tested, which is shown in FIG. 2, is automatically preceded by the testing of member F1 as shown in FIG. 3. When the testing of member F1 has just been concluded without any error being detected by detector E1, the last microinstruction contained in area s1 in FIG. 1 causes data to be consulted supplied by the detector E2 which indicates whether an error has been detected in a member Fj and whether this member is one of the subsequent members: F3, F4, ...Fn. If member Fj is one of the said members it is tested by direct access to the appropriate sequence in area sj in store R0. If member Fj is not one of the said members, member F2 is tested by access to the appropriate sequence in area s2 in store R0. As shown in FIG. 2, after each member has been tested, the test is repeated if an error is detected by detector E1 and not all the fault symptoms are available, or if an error is detected by detector E2 when processing has been stopped. In particular, FIG. 3 shows that member Fn is either tested immediately after member F1 has been tested when an error is detected by detector E2 when data is being processed, or after all the members (F1,...Fn−1) preceding member Fn have been tested when unit P1 is put into operation. If detector E1 detects no error when member Fn is being tested even though detector E2 detected one, member Fn is again tested after member F1 has been tested. If detector E1 detects an error after an error has been detected by detector E2 and if all the fault symptoms are available, diagnosis is carried out. If not all the fault symptoms are available, member Fn is again tested after member F1 has been tested. If detector E1 detects no error in member Fn when unit P1 is put into operation (after it has tested members (F1,...Fn−1) in succession) a signal which allows data to be processed in unit P1 is generated, by store R0 for example, and is transmitted by circuits T in FIG. 1.

Figure 4:
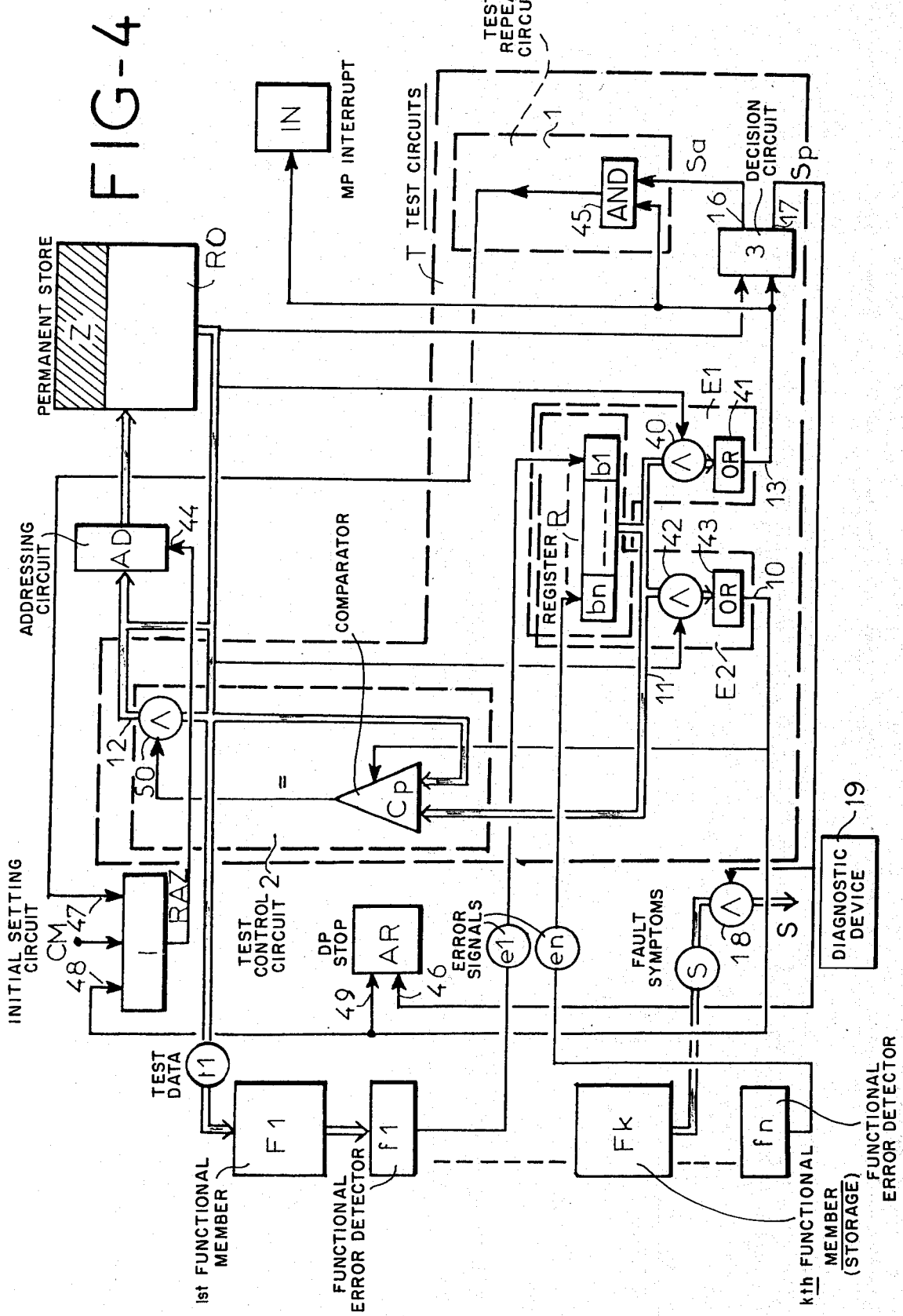
FIG. 4 is a diagram of an embodiment of the improvement to a test system according to the invention, the operation of which is illustrated in FIG. 3.

In FIG. 4, member F1 (which is one of the group of functional members F1,...Fn) which contains the basic logic of unit P1 is tested by a combination of signals (t1) originating from the permanent store R0 in FIG. 1. The outputs of member F1 are connected to a functional-error detector f1. Similarly, member Fn (which is not shown in FIG. 4) is connected at its outputs to a functional-error detector fn. When one of the members (F1,...Fn) is faulty, the appropriate detector from the group of detectors (f1...fn) emits from its output an error signal (one of the group of signals (e1)...(en) to one of the flip-flops (b1...bn) which make up a register R which is common to the detectors E1 and E2 in FIG. 1. Consulting the various flip-flops (b1...bn) thus enables the faulty functional member to be identified. If for example one error signal from the group (e1)...(en) sets the appropriate flip-flop to the logic 1 state, the defective functional member is located by the fact of the said flip-flop being in the logic 1 state. Besides register R, the detector E1 from FIG. 1 includes, in FIG. 4, a transfer circuit 40 which is formed by a group of AND gates and which passes the combination of signals from register R to an OR gate 41 in response to a validation signal which is produced in the permanent store R0 when unit P1 is being tested.

A signal at output 13 of OR gate 41 indicates that an error has appeared in one of the members (F1,...Fn) and that the error has been detected while processing unit P1 was being tested. Besides register R, detector E2 in FIG. 4 includes a transfer circuit 42 similar to circuit 40, which is validated by a signal from permanent store R0, while data is being processed, provided that no error is detected by detectors E1 and E2. A signal at output 10 of an OR gate 43 located at the output of circuit 42 indicates the existence of an error in a functional member when data is being processed. The circuit AD for addressing the permanent store R0 in FIG. 1 is shown in FIG. 4 with an additional input 44 connected to an initial setting circuit I for unit P1. By means of a manual control CM, circuit I generates a signal RAZ to reset circuit AD to zero. The microprogrammes for testing the various members (F1,...Fn) are contained in an area Z of the permanent store R0 which begins with an address O which is addressed when circuit AD is reset to zero. When unit P1 is put into operation, an initial setting routine is first of all carried out, for example in the aforesaid way described in Patent application "Testing System for Testing a Data Processing Unit," Ser. No. 450,936. When the sequence for setting unit P1 to an initial state is concluded, access is opened to a first sequence for testing functional member F1, as a result of circuit AD addressing the first address in area s1 in store R0, which is shown in FIG. 1. If no error is detected by detector E1 when member F1 is tested after unit P1 has been put into operation, all the test sequences corresponding to areas (s1,...sn) in FIG. 1 are carried out in succession provided that the detector E1 does not detect an error. If an error is detected by detector E1 while unit P1 is being tested, a signal at output 13 of OR gate 41 is transmitted to a circuit IN for interrupting the microprogramme being carried out, and to a decision circuit 3 which also appears in FIG. 1. By means of a signal Sa fed to the circuit 1 shown in FIGS. 1 and 4, output 16 of circuit 3 indicates that not all the fault symptoms required to locate a fault in the member in which detector E1 has detected an error are available. If on the other hand all the fault symptoms are available, the said symptoms (S) are transferred, by means of a signal Sp, by a transfer circuit 18 in a storage member Fk in unit P1 to the diagnostic device 19 which may be a member connected to unit P1. Signal Sp is also fed to an input 46 of a circuit AR which stops unit P1 while the diagnosis is taking place. Circuit 1 in FIG. 4 comprises an AND gate 45 one of whose inputs receives the error signal from output 13 of detector E1 and the other of whose inputs receives signal Sa. The output from this gate 45 controls circuit I via an input 47. In the embodiment shown in FIG. 4 and in accordance with the method of operation shown in FIG. 3, when detector E1 detects an error, this causes unit P1 to be set to its initial state and the testing of all the functional members which, in the ordinal series, precede the member found to be defective. This embodiment is in no way limiting and in particular does not preclude an embodimdent which consists in testing the defective member after unit P1 has been set to its initial state and the first member F1 has been tested. This is achieved by, for example, using a microinstruction at the end of the sequence for testing member F1 which is designed to test the defective member (which is not F1) directly by making a comparison between the contents of the register R which forms part of the detector E1 and a succession of data items which represent the various members (F2,...Fn) one of which is the member found to be defective by detector E1. Circuit 2 from FIG. 1 includes, in FIG. 4, a comparator $Cp$ of which a first group of inputs is connected to output 11 of detector E2 and of which a second group of inputs is connected to the permanent store RO. A validation signal is transmitted to comparator $Cp$ from output 10 of detector E2 when an error is detected while data is being processed. Output 10 of detector E2 is also connected to one input 48 of circuit I and to an input 49 of circuit AR. When an error is detected in member $Fj$ by detector E2, the current processing operation is halted by circuit AR and unit P1 is caused to be reset to its initial state via input 48 in circuit I. A test is then carried out on member F1. If member $Fj$ is member F1 and if the fault in question is a permanent one, it is detected by detector F1. When circuit 3 produces signal $Sp$ at its output 17, the diagnostic process may be carried out immediately. On the other hand, circuit 3 may generate signal $Sa$ if the fault in question is an intermittent one which disappeared before the testing of member F1 had been completed. In this case input 47 of circuit I is used to cause the test on member F1 to be repeated after unit P1 has been reset to its initial state. If member $Fj$ is not member F1, detector E1 does not detect an error in this member F1 and, by means of a last microinstruction contained in area $s1$ of store RO in FIG. 1, at least one comparison is made in comparator $Cp$ to identify member $Fj$ with one of the members $(F2,...Fn)$. If detector E1 does not detect an error while member $Fj$ is being tested, the error detected by detector E2 must therefore be an intermittent fault. The result of the presence of an error signal at output 10 of detector E2 is that unit P1 is reset to its initial state and member F1 is tested, before the test on member $Fj$ is repeated. Member $Fj$ is tested by means of at least one comparison between the data from the two groups of inputs, which results in a signal at the output of comparator $Cp$ when the data being compared is the same. The output of comparator $Cp$ is connected to a transfer circuit 50 to enable transfer of the first address in the area $sj$ at which store RO must be addressed by circuit AD when member $Fj$ is to be tested. The symptoms which enable a fault to be located are identified by, for example, simulating the faults one by one in a data processing unit which is in good working order and by bringing together all the manifestations of the presence of each simulated fault. Which faults are to be simulated is determined by a statistical study which allows a list to be drawn up of all foreseeable faults which may have a disturbing effect in processing, including intermittent faults. The process of testing processing unit P1 is broken down in the present invention into a number of test-sequences which is sufficiently large for the duration of each sequence to be compatible with the minimum time for which disturbing intermittent faults persist and for it to be possible to detect and locate an intermittent fault at the level of a functional member of unit P1.

In order to collect all the manifestations of a fault in a functional member of unit P1, microinstructions for testing this member are carried out in a time which is determined by a signal which is transmitted to circuit 3 from store RO. At the end of the sequence, circuit 3 generates a signal $Sp$ when an error signal from output 13 of detector E1 is present for the whole time during which the signal from store RO is present. Circuit 3 generates a signal $Sa$ when the signal from output 13 of detector E1 is not present for the whole time during which the signal from store RO is present. Circuit 3 is made to operate in this way by, for example, a flip-flop.

The improved system for testing a data processing unit which forms the subject of the present invention in particular enables a functional member in the said unit to be tested when an error is detected while data is being processed. If the fault in question is an intermittent one which disappears during testing, detector E2 causes the member in question to be tested repeatedly until the fault reappears and is detected by detector E1. If the fault is not present for a sufficiently long time for the symptoms S to be collected, the testing of the member is repeated by means of signal $Sa$ until the said fault is present for the whole duration of the signal from store RO. By means of signal $Sp$, a diagnosis may then be carried out by transferring the fault symptoms (S) to a diagnostic device.

The above description relates only to a particular embodiment of the invention and includes all modifications thereof. The invention may be applied to any data processing unit which includes a permanent store for microprogrammes and in particular to a peripheral unit controller the testing of which may be ordered by another processing unit such as a central processor unit so that the said controller will detect and locate its own intermittent faults.

We claim:
1. In a data processing system including first and second functional members, improved apparatus for testing the first and second functional members comprising:
store means for storing a first microprogram beginning at a first address for testing the first functional member and for storing a second microprogram beginning at a second address for testing the second functional member;
address means for sequentially addressing and reading the first microprogram out of the store means in response to the first address, and for sequentially addressing and reading the second microprogram out of the store means in response to the second address;
means for conducting the microinstructions to the first and second functional members as the microinstructions are read out of the store means so that symptom signals are produced by either one of the first and second functional means which is defective;
validating means for generating a first control signal when all symptom signals needed to diagnose a defective one of the first and second functional members are available and for generating a second control signal when any symptom signal needed to diagnose a defective one of the first and second functional members is missing;
first error detector means connected to the first and second functional members and operative during the testing of the first and second functional members for generating a first indicating signal which identifies a defective one of the first and second functional members;
first circuit means responsive to the first indicating signal and the second control signal for transmitting the first address to the address means if the first indicating signal indicates that the first functional member is defective and for transmitting the second address to the address means if the first indicating signal indicates that the second func- tional member is defective, so that the defective functional member is tested again if any symptom signal needed to diagnose the defective functional member is missing;

second error detector means connected to the first and second functional members and operative during data processing by the data processing system for generating a second indicating signal which identifies a defective one of the first and second functional members;

second circuit means responsive to the second indicating signal for transmitting the first address to the address means if the second indicating signal indicates that the first functional member is defective and for transmitting the second address to the address means if the second indicating signal indicates that the second functional member is defective, so that a test of the defective functional member will be initiated; and means for transmitting the symptom signals to a diagnostic device in response to the first control signal.

2. Apparatus, according to claim 1, wherein the store means comprises a read-only memory.

3. Apparatus, according to claim 1, wherein the first address is zero, wherein the data processing system further includes an initial setting circuit to reset the address means, and wherein the first circuit means is connected to the address means through said initial setting circuit.

4. Apparatus, according to claim 3, wherein the second circuit means is connected to the address means through said initial setting circuit.

5. Apparatus, according to claim 3, wherein the first circuit means is an AND gate having a first input connected to an output of the first error detector means and having a second input connected to an output of the validating means, the output of the AND gate being connected to said initial setting circuit.

6. Apparatus, according to claim 4, wherein said second circuit means includes a comparator having a first group of inputs connected to a group of outputs of the second detector means and having a second group of inputs connected to a group of outputs of the store means, the second circuit means further including transfer means, validated by the said comparator, for transferring a combination of signals from the store means to the inputs of the address means.

7. Apparatus, according to claim 1, wherein the validating means comprises a flip-flop having a first input connected to an output of the store means, having a second input connected to the output of the first error detector means, having a first output connected to an input of the first circuit means and having a second output connected to a validating input of the means for transmitting.

* * * * *